(12) United States Patent
Haustein et al.

(10) Patent No.: US 8,897,275 B2
(45) Date of Patent: Nov. 25, 2014

(54) PRECODING IN TELECOMMUNICATION NETWORK

(75) Inventors: Thomas Haustein, Potsdam (DE); Egon Schulz, München (DE); Wolfgang Zirwas, München (DE)

(73) Assignee: Nokia Siemens Networks Oy, Espoo (FI)

( * ) Notice: Subject to any disclaimer, the term of this patent is extended or adjusted under 35 U.S.C. 154(b) by 553 days.

(21) Appl. No.: 13/146,095

(22) PCT Filed: Jan. 26, 2009

(86) PCT No.: PCT/EP2009/050856
§ 371 (c)(1),
(2), (4) Date: Jul. 26, 2011

(87) PCT Pub. No.: WO2010/083892
PCT Pub. Date: Jul. 29, 2010

(65) Prior Publication Data
US 2011/0280163 A1    Nov. 17, 2011

(51) Int. Cl.
*H04J 3/00* (2006.01)
*H04L 25/03* (2006.01)
*H04L 5/00* (2006.01)

(52) U.S. Cl.
CPC ........ *H04L 25/03343* (2013.01); *H04L 5/0032* (2013.01); *H04L 2025/03426* (2013.01)
USPC ........... 370/337; 370/328; 370/330; 370/336; 370/345; 370/346; 370/347; 370/350

(58) Field of Classification Search
CPC .. H04L 1/0693; H04L 5/0057; H04B 7/0626; H04B 7/0632
See application file for complete search history.

(56) References Cited

U.S. PATENT DOCUMENTS

| 2004/0203468 | A1 | 10/2004 | Dent et al. ................. 455/67.14 |
| 2008/0165866 | A1* | 7/2008 | Teo et al. ........................ 375/260 |
| 2009/0117911 | A1* | 5/2009 | Molisch et al. ............... 455/450 |
| 2010/0118706 | A1* | 5/2010 | Parkvall et al. ............... 370/241 |
| 2011/0170427 | A1* | 7/2011 | Koivisto et al. ............... 370/252 |
| 2012/0099540 | A1* | 4/2012 | Doppler et al. ............... 370/329 |
| 2012/0106517 | A1* | 5/2012 | Charbit et al. ................ 370/336 |

FOREIGN PATENT DOCUMENTS

| EP | 1 873 957 A1 | 1/2008 |
| EP | 1 942 624 A2 | 7/2008 |
| WO | WO 03/094460 A2 | 11/2003 |
| WO | WO 2008/073335 A2 | 6/2008 |

\* cited by examiner

*Primary Examiner* — Jae Y Lee
(74) *Attorney, Agent, or Firm* — Harrington & Smith

(57) ABSTRACT

It is described a method for compensating interference effects within a telecommunication network including at least a first base station and a second base station, which serve in a cooperative manner a first user equipment and a second user equipment by using time division duplex. The method is applied in an operational state, in which the first base station is in a downlink mode and the second base station is in an uplink mode. The method includes (a) determining at least one of a first channel state information between the first base station and the second base station and a second channel state information between the first user equipment and the second user equipment, (b) encoding data signals based on the first and/or the second channel state information, and (c) transmitting the encoded data signals by the first base station and/or by the second base station. It is further described a telecommunication network, a program element and a computer readable medium, which are adapted to carry out or control the described method.

11 Claims, 5 Drawing Sheets

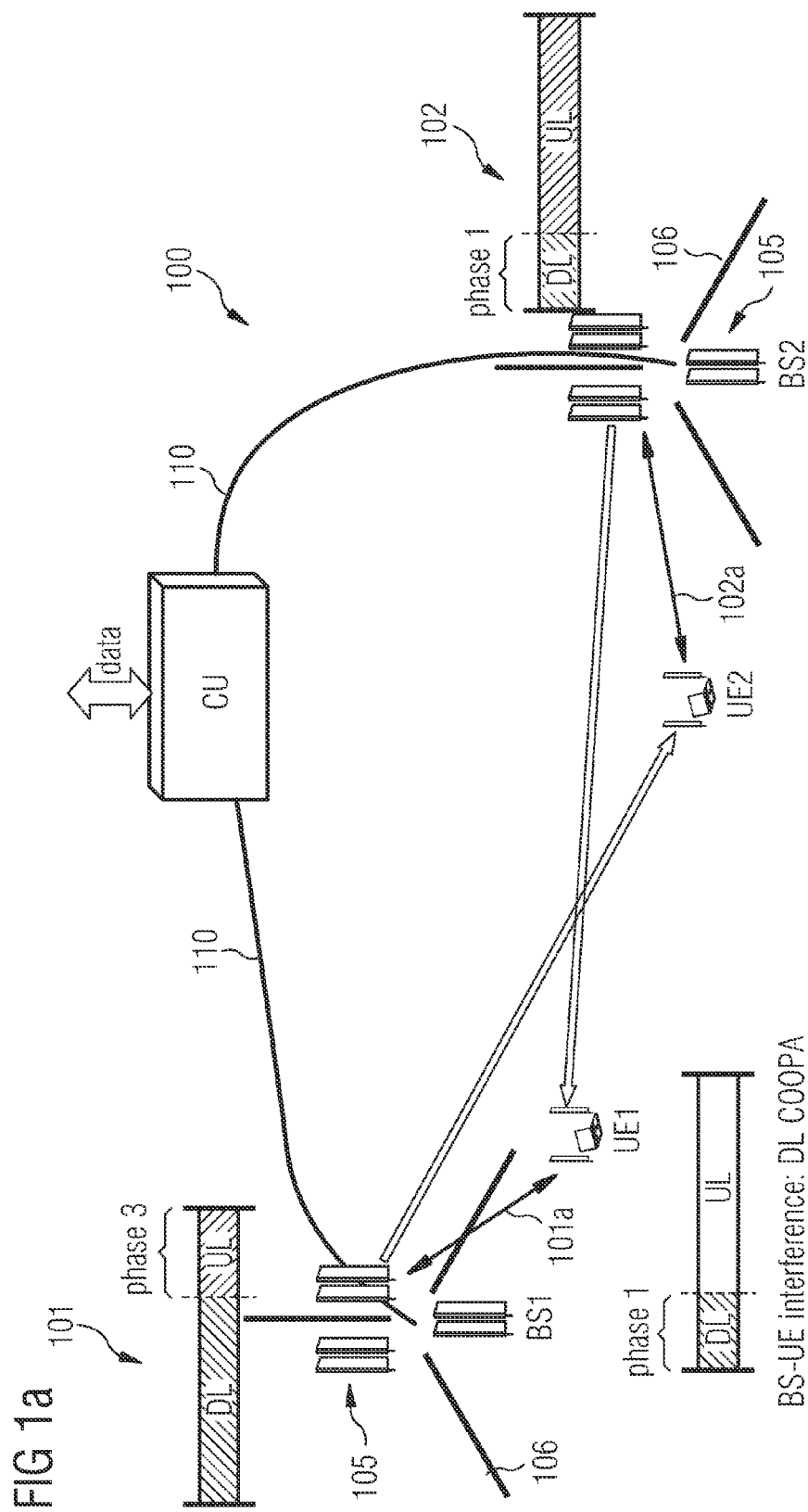

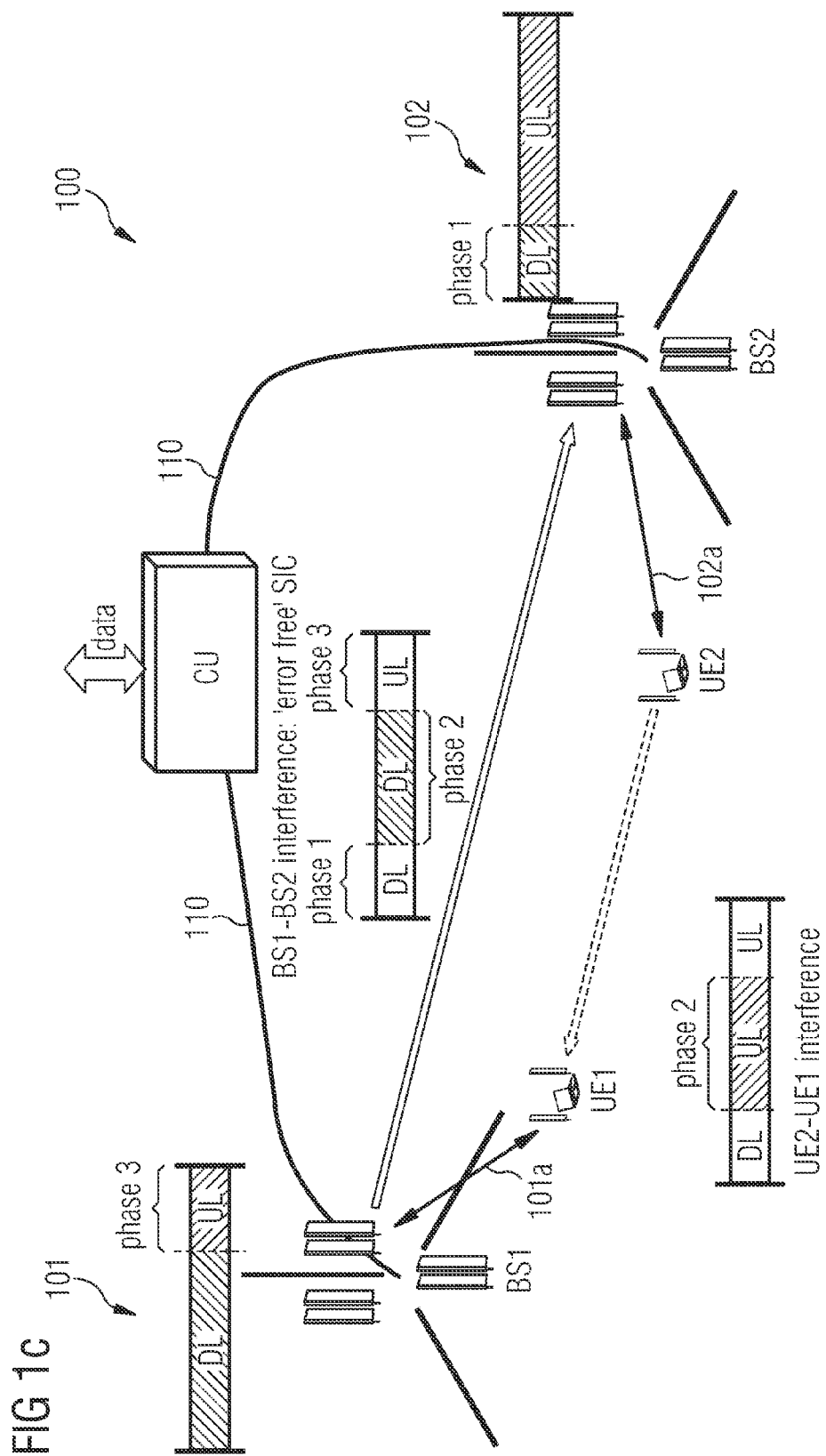

PRECODING IN TELECOMMUNICATION NETWORK

FIELD OF INVENTION

The present invention generally relates to the field of mobile telecommunication network like 3GPP Long Term Evolution (LTE) networks for instance in the current release 8 as well as to the successive release 9 and to the issues concerning system performance in case of Time Division Duplex (TDD) in cooperative antenna (COOPA) systems. Specifically, the present inventions relates to a method for compensating interference effects within a telecommunication network comprising at least a first base station and a second base station, which serve in a cooperative manner a first user equipment and a second user equipment. Further, the present invention relates to a telecommunication network, to a program element and to a computer readable medium, which are adapted to carry out or to control the described interference compensating method.

ART BACKGROUND

Mobile telecommunication networks comprise a plurality of network cells each having at least one base station used to receive and transmit signals from user equipments (UEs), e.g. mobile phones or Personal Digital Assistants. A plurality of different network environments or network systems such as for instance GERAN, UTRAN, LTE, E-UTRAN, WCDMA or WLAN is known. For ensuring a good network performance and in particular an effective data transmission it has to be ensured that all data, data signals or data packets are received at the intended recipient. Depending on the direction of a data transfer the recipient may be a UE or a base station (BS). In case of a relay enhanced network the recipient may also be a relay station or a relay node.

One problem limiting the performance of the data transmission known in the prior art is inter cell and intra cell interference. In order to reduce the inter cell interference so called cooperative antenna (COOPA) networks are proposed. In a COOPA network a coordinated processing is carried out for at least two BSs and at least one UE is simultaneously provided with data on the same radio transmission resource (Physical Resource Block, PRB) from the at least two coordinated BSs. Thereby, the Signal to Interference and Noise Ratio (SINR) for the UE can be increased significantly. From theory significant performance gains with respect to capacity and coverage are known for full cooperating cellular radio networks compared to conventional radio networks. It is known from theory that these large gains cannot be achieved with other technologies. Therefore, COOPA networks provide an upper bound for interference limited cellular radio networks. As a consequence, it is very likely that at least some form of cooperation will have to be implemented in future radio telecommunication networks.

In the meantime different types of COOPA networks have been proposed. However, within this application a basic COOPA cell of a cooperation area (CA), which comprises two cooperating BSs and two UEs will be discussed.

FIG. 2 schematically illustrates a basic solution for cooperative joint transmission, which is helpful for understanding of the invention described in this application. In particular, a central unit (CU) may be foreseen for COOPA networks to perform a joint precoding and—as the name suggests—may be placed at a central point of the CA at one of the cooperating BSs. The other cooperating BS may be connected to this CU by fast and low delay optical fiber connections.

The CU may perform in downlink (DL) a common signal precoding like joint transmission, which is basically a matrix multiplication of all data signals for all cooperating UEs with a precoding matrix $\underline{W}$. In case of zero forcing (ZF), wherein the precoding is carried out in such a manner that there is no interference, the precoding matrix $\underline{W}$ is the pseudo inverse $\underline{H}^+$ of the overall channel matrix $\underline{H}$. The simplest form of a CA for a codebook based precoding is illustrated in FIG. 2. In this case, the precoding matrix $\underline{W}$ is selected from a codebook based on the estimated radio channels between all involved UEs and BSs. This can be done either by using the uplink (UL)-downlink (DL) reciprocity with respect to the corresponding electromagnetic pulse propagation (for TDD systems) or by an explicit signaling by the UE1 and the UE2. Taking into account the described channel reciprocity may provide the advantage that the feedback overhead can be reduced significantly. Therefore, this technique is an interesting candidate for performing cooperation.

In particular, FIG. 2 shows data packets d1 and d2 to be transmitted to UE1 and UE2. For the common signal processing the data packets are encoded by using the matrix $\underline{W}$ to form the data signals tx (tx1, tx2) to be transmitted to the BS1 serving UE1 and to the BS2 serving UE2, where signals $r_1$ and $r_2$ are received, respectively. The signals $r_1$ and $r_2$ correspond to the multiplication of the channel matrix $\underline{H}$, the pseudo inverse $\underline{H}^+$ or $\underline{W}$ and the data d to be transmitted offset by an offset vector n.

Compared to Frequency Division Multiplex (FDD) systems TDD systems are prone to higher interference as BSs receive interference from other BSs or UEs that transmit during the same time. Additionally, interference can be caused by large propagation delays and by signals arriving at times after a main signal component has arrived. This holds in particular if moderate guard intervals or short cyclic prefixes in connection with large coverage areas are used. For this reason, in order to reduce such interference in such systems strong beamforming will be combined with synchronized transmissions from all BSs.

In order to reduce interference within TDD systems, it is currently planned to use identical switching points for all BSs. In this context a switching point is defined by the point in time, when a BS changes from UL reception to DL transmission or vice versa. However, identical switching points for all BSs have the disadvantage of reducing the TDD adaptability to DL-UL traffic asymmetries (i.e. DL and UL transmission are of different length.

There may be a need for adapting COOPA techniques to allow for variable switching points in TDD systems, while simultaneously exploiting well known COOPA gains from known FDD systems.

SUMMARY OF THE INVENTION

This need may be met by the subject matter according to the independent claims. Advantageous embodiments of the present invention are described by the dependent claims.

According to a first aspect of the invention there is provided a method for compensating interference effects within a telecommunication network comprising at least a first base station and a second base station, which serve in a cooperative manner a first user equipment and a second user equipment by using time division duplex, wherein the telecommunication network is in an operational state, in which the first base station is in a downlink mode and the second base station is in an uplink mode. The provided method comprises (a) determining at least one of a first channel state information between the first base station and the second base station and a second channel state information between the first user equipment and the second user equipment, (b) encoding data signals based on the first channel state information and/or on the second channel state information and (c) transmitting the encoded data signals by the first base station and/or by the second base station.

This first aspect of the invention is based on the idea that with a knowledge of different channel state information (CSI) between different network elements of the telecommunication network, the data signals can be encoded in such a manner that the interference is reduced. Preferably, different data signals are encoded in such a manner, that they are at least partially orthogonal.

The described interference compensating method may provide the advantage that a cooperative radio data communication within the telecommunication network can be carried out even (a) if Time Division Duplex (TDD) is employed and (b) asymmetric variable switching points are used for different BSs. In this respect a switching pint is the moment in time when a BS switches from a downlink (DL) transmission to an uplink (UL) reception of data signals.

In this respect it is mentioned that the described method can also reduce interference problems which are caused by large propagation delays and signal components arriving at times after a main signal component has arrived at the respective receiving network element. This holds at least if compared to a large spatial coverage only a comparatively short cyclic prefix is used for the corresponding data packages.

The described interference compensating method may further provide the advantage that the main benefit of TDD systems, which is the possibility for an flexible DL/UL switching point and which allows to exploit available frequency resources much more effective than in case of an FDD system, can also be used in a cooperative antenna (COOPA) telecommunication system. In known cellular radio systems relying on TDD this advantage is often sacrificed due to difficult interference conditions so that a stable system is only possible with a fixed and common switching point, which is typically located in the time middle of the respective radio frame.

In other words, gains of the described interference compensating method are the spectral efficiency, the flexibility and possible higher peak data rates if for instance all radio transmission resources are given for a DL transmission. Further, a significantly higher coverage can be achieved. This might be important for UL radio transmissions, where in current TDD systems UEs can transmit only during a half subframe limiting the overall transmission power.

It is pointed out that the described method can be applied in connection with the known Multiple Input-Multiple Output (MIMO) technology, wherein both the transmitting network element and the receiving network element are equipped with at least two antenna elements. With a proper phase relation between the partial signals being fed to the different antenna elements a beam forming may be accomplished. In this context the encoding of the data signals is also called precoding.

Another advantage of the described method, which may be related to a MIMO telecommunication network, may be seen in the possibility to use less antenna elements per network element as compared to for instance current Time Division-Synchronous Code Division Multiple Access (TD-SCDMA) networks, wherein extensive beamforming or smart antenna techniques have to be applied to cope with detrimental interference conditions. In TD-SCDMA networks for an amplification of analog radio feed-in signals a high number of Radio Frequency (RF)-chains will result in high Capital Expenditure (CAPEX) and a high Operational Expenditure (OPEX).

By contrast thereto, a COOPA system which is operated with the described method can use the antenna elements of different network elements in order to form a distributed MU-MIMO system with according performance gains.

According to an embodiment of the invention for encoding the data signals a channel reciprocity is taken into account. This may provide the advantage that the signaling overhead or the overall data transmissions can be reduced. The reciprocity principle is based on the property that electromagnetic waves traveling in both directions will undergo the same physical perturbations such as reflections, refractions, diffractions, etc. Therefore, if the radio link operates on the same frequency band in both directions, the impulse response of the channel observed between any two antennas should be the same regardless of the direction.

Generally speaking, the described interference compensating method resolves or alleviates the most severe interference conditions for cellular TDD telecommunication networks with variable switching points. Thereby, available CSI can be easily exploited due to channel reciprocities.

If it is assumed that the variable switching points of the BSs will not be changed to often (the switching points may be changed semi statically), the operational state of the telecommunication network can be adapted effectively to variable load and traffic conditions.

In conventional TDD COOPA systems, wherein one and the same switching point is used for all BS being operated in a cooperative manner, the radio channels linking different BSs with each other cannot be estimated directly because all BSs will either be in transmit mode or in receive mode. For that reason specific measurement phases will have to be defined for a channel estimation of the BS to BS connections. One option for this is to let all BSs, which are still in DL phase, transmit reference signals as soon as the first BS changes into the UL mode. As later other BSs might follow to UL mode further reference signals might have to be transmitted from the BSs which are still in DL mode. This would guarantee to obtain CSI with the shortest latency. However, from a data overhead perspective this is not the optimum solution.

According to a further embodiment of the invention the method further comprising (a) broadcasting a first reference signal by the first base station and (b) receiving the first reference signal by the second base station. Therein, for determining the first channel state information the received first reference signal is taken into account.

The first reference signal may be transmitted on a particular subframe. This particular subframe may be chosen by a central unit or by a specific controlling BS within the COOPA telecommunication network.

The first reference signal may be sent at the end of a previous subframe, where all BSs will be in UL mode. For that purpose the corresponding BS might just be assumed as to represent an additional UE.

Preferably, the first reference signals for channel estimation are broadcasted by the BSs in the downlink (DL) phase. Further, the first reference signals should be orthogonal to each other so that all available radio channels can be estimated.

Generally speaking, the base station which is suffering from interference from the other base station can determine the corresponding first channel state information. Thereby, the reference signal may be any signal which is known both to the first base station and to the second base station.

According to a further embodiment of the invention the first reference signal is broadcasted every nth subframe. Thereby, n is an integer number.

Since the BS-BS radio channel extends between two spatially fixed network elements, it can be assumed that the time variance of the BS-BS radio channel will be very small. The number n should be decided by a main BS controlling the cooperation area (CA) based on the time variance of the BS-BS channels. For identification of the main BS, which might be for instance the first BS or the second BS, and/or for defining the CAs known techniques for self optimizing a network might be used.

According to a further embodiment of the invention the first reference signal is broadcasted on at least one specific frequency sub-band. Thereby, the above described reference signal broadcasting, which is carried out only in every nth subframe, can be combined with the described specific sub-band selection. The result of such a combination may mean that the first reference signal can be broadcasted on a sparse grid, which descriptively speaking extends within a coordinate system being defined by a time axis and a frequency axis.

According to a further embodiment of the invention for determining the second channel state information second reference signals are transmitted on specific downlink subframes. Thereby, the first UE and/or the second UE may be made aware of which specific subframes are to be used for the determination of the second channel state information (CSI) by their respective serving base station.

Preferably, the second reference signals for channel estimation are broadcasted by the UEs in uplink (UL) phase. The second reference signals should be orthogonal to each other so that all available radio channels can be estimated in a reliable manner.

As UEs might move quite fast, the determination of the second CSI should preferably be done regularly and with low latency. For that purpose the DL signal from the serving eNBs should may have resource elements (RE) inserted, which carry no data nor reference signals at that symbol where UL transmission of the interfering UEs starts and at those REs where the UE will send own reference signals for CSI estimation. This will allow the interfered UEs to obtain an accurate channel estimation.

Preferably, the UEs are informed by their serving BSs over according control channels where to measure the radio channels of the interfering UEs as well as from which subframe onwards they will have to expect additional UE interference.

According to a further embodiment of the invention the method further comprises transmitting the second channel state information to the first base station and/or to the second base station. This may provide the advantage the first and/or the second BS will be informed also about channel states, which are not directly related to the first BS and/or to the second BS, respectively. However, a precise knowledge of such channel state information may be useful for DL data transmission in order to optimally encode the corresponding data signals in such a manner that interference is minimized.

According to a further embodiment of the invention the second channel state information is only transmitted to the first base station and/or to the second base station if a data retransmission is required. This may provide the advantage that the feedback overhead may be reduced significantly.

For controlling a data retransmission a Hybrid Automated Repeat Request (HARQ) procedure may be used. Thereby, a first signal and retransmitted second signal are combined with each other in order to obtain the original data signal.

According to a further embodiment of the invention the data retransmission is carried out (a) with a first retransmission data unit, which is transmitted during a first phase of the telecommunication network, during which both the first base station and the second base station are in a downlink mode, and/or (b) with a second retransmission data unit, which is transmitted during a second phase of the telecommunication network, during which the first base station is still in the downlink mode and the second base station is already in an uplink mode.

In other words, the first retransmission data unit is send during a time phase without interference between the first UE and the second UE. Therefore, there will be only comparatively small bit error rates for the first retransmission data unit being sent in the downlink direction. By contrast thereto, the second retransmission data unit is send during a time phase with an existing interference between the second UE and the first UE. As a consequence, there is a degraded decoding probability.

The described differentiation between the first and the second retransmission data unit may provide the advantage that the size of the retransmission data unit can be adapted to the actual interference condition. Thereby, the retransmission overhead can be reduced significantly.

According to a further embodiment of the invention the method further comprises transmitting data from the first base station to the second base station over (a) the radio link extending between the two base stations and (b) a backbone network which wire-connects the two base stations with each other.

This may provide the advantage that based on an estimation of the radio channel between the two BSs a quasi "error free" Successive Interference Cancelation (SIC) can be performed at the interfered second BS as soon as the interfering first BS has send the transmitted data over the backbone network to the interfered second BS.

Within SIC the typically the following steps are accomplished: (a) From a sum signal comprising different individual analog signals the strongest individual signal is detected. (b) Subsequently, the strongest individual signal is subtracted from the sum signal. (c) From the remaining sum signal again the strongest individual signal is detected. (d) The steps (b) and (c) are repeated until all required individual analog have been detected.

In this respect it is mentioned that the term "wire-connected" includes all kinds of direct and indirect connected, which allow for non-wireless data transmissions. In particular, "wire-connected" may include the use of traditional data cables and optical fibers.

According to a further embodiment of the invention the method further comprises transmitting a control signal (a) from the first base station to the first user equipment and/or (b) from the second base station to the second user equipment. The control signal is indicative for a particular subframe, during which the second channel state information is determined.

Generally speaking, according control signals may be sent by the BSs so that all UEs know for what subframes or for what symbols channel estimation has to be performed for interfering UEs.

Additionally the measured CSI information may be fed back to the BSs so that in case of a Not Acknowledgement (NACK) for an interfered first or second retransmission data unit the corresponding BS can retransmit an according correction signal. Since the CSI is only required in case of a NACK message, i.e. a decoding failure, the CSI may be piggybacked to the corresponding NACK message, while in case of an Acknowledgement (ACK) no CSI will have to be fed back.

According to a further aspect of the invention there is provided a telecommunication network for compensating interference effects, in particular a time division duplex cooperating telecommunication network. The provided telecommunication network comprises (a) a first user equipment and a second user equipment and (b) a first base station and a second base station, which are adapted to serve the first user equipment and the second user equipment in a cooperative manner and which are settable in an operational state, in which the first base station is in a downlink mode and the second base station is in an uplink mode. The telecommunication network further comprises (c) a determining unit for determining at least one of a first channel state information between the first base station and the second base station and a second channel state information between the first user equipment and the second user equipment, (d) an encoding unit for encoding data signals based on the first channel state information and/or on the second channel state information, and (f) a transmitting unit for transmitting the encoded data signals by the first base station and/or by the second base station.

This second aspect of the invention is based on the idea that with a precise CSI knowledge of different channel state information (CSI) between different network elements of the telecommunication network, the data signals can be encoded in such a manner that the interference is reduced. Preferably, different data signals are encoded in such a manner, that they are at least partially orthogonal with respect to each other.

Depending on the scheduled transmitter of the data signals the encoding unit and/or the transmitting unit may be provided in the first and/or second BS or in the first and/or second UE. The first determination unit is preferably provided at one of the BSs. The second determination unit is preferably provided at one of the UEs. The other units may be assigned to at least one of the network elements of the described telecommunication network.

According to a further aspect of the invention there is provided a program element for compensating interference effects within a telecommunication network comprising at least a first base station and a second base station, which serve in a cooperative manner a first user equipment and a second user equipment by using time division duplex. The program element, when being executed by a data processor, is adapted for controlling the method as set forth in any one of the claims 1 to 10.

The program element may be implemented as computer readable instruction code in any suitable programming language, such as, for example, JAVA, C++, and may be stored on a computer-readable medium (removable disk, volatile or non-volatile memory, embedded memory/processor, etc.). The instruction code is operable to program a computer or any other programmable device to carry out the intended functions. The computer program may be available from a network, such as the World Wide Web, from which it may be downloaded.

The invention may be realized by means of a computer program respectively software. However, the invention may also be realized by means of one or more specific electronic circuits respectively hardware. Furthermore, the invention may also be realized in a hybrid form, i.e. in a combination of software modules and hardware modules.

According to a further aspect of the invention there is provided a computer-readable medium on which there is stored a computer program for compensating interference effects within a telecommunication network comprising at least a first base station and a second base station, which serve in a cooperative manner a first user equipment and a second user equipment by using time division duplex. The computer program, when being executed by a data processor, is adapted for controlling the method as set forth in any one of the claims 1 to 10.

It has to be noted that embodiments of the invention have been described with reference to different subject matters. In particular, some embodiments have been described with reference to method type claims whereas other embodiments have been described with reference to apparatus type claims. However, a person skilled in the art will gather from the above and the following description that, unless other notified, in addition to any combination of features belonging to one type of subject matter also any combination between features relating to different subject matters, in particular between features of the method type claims and features of the apparatus type claims is considered as to be disclosed with this application.

The aspects defined above and further aspects of the present invention are apparent from the examples of embodiment to be described hereinafter and are explained with reference to the examples of embodiment. The invention will be described in more detail hereinafter with reference to examples of embodiment but to which the invention is not limited.

BRIEF DESCRIPTION OF THE DRAWINGS

FIGS. 1a-1d show for a cooperating area within a TDD telecommunication network, which is operated in an asymmetric manner, various phases and the corresponding interference constellations between two base stations and two user equipments.

DETAILED DESCRIPTION

Figure 1B:
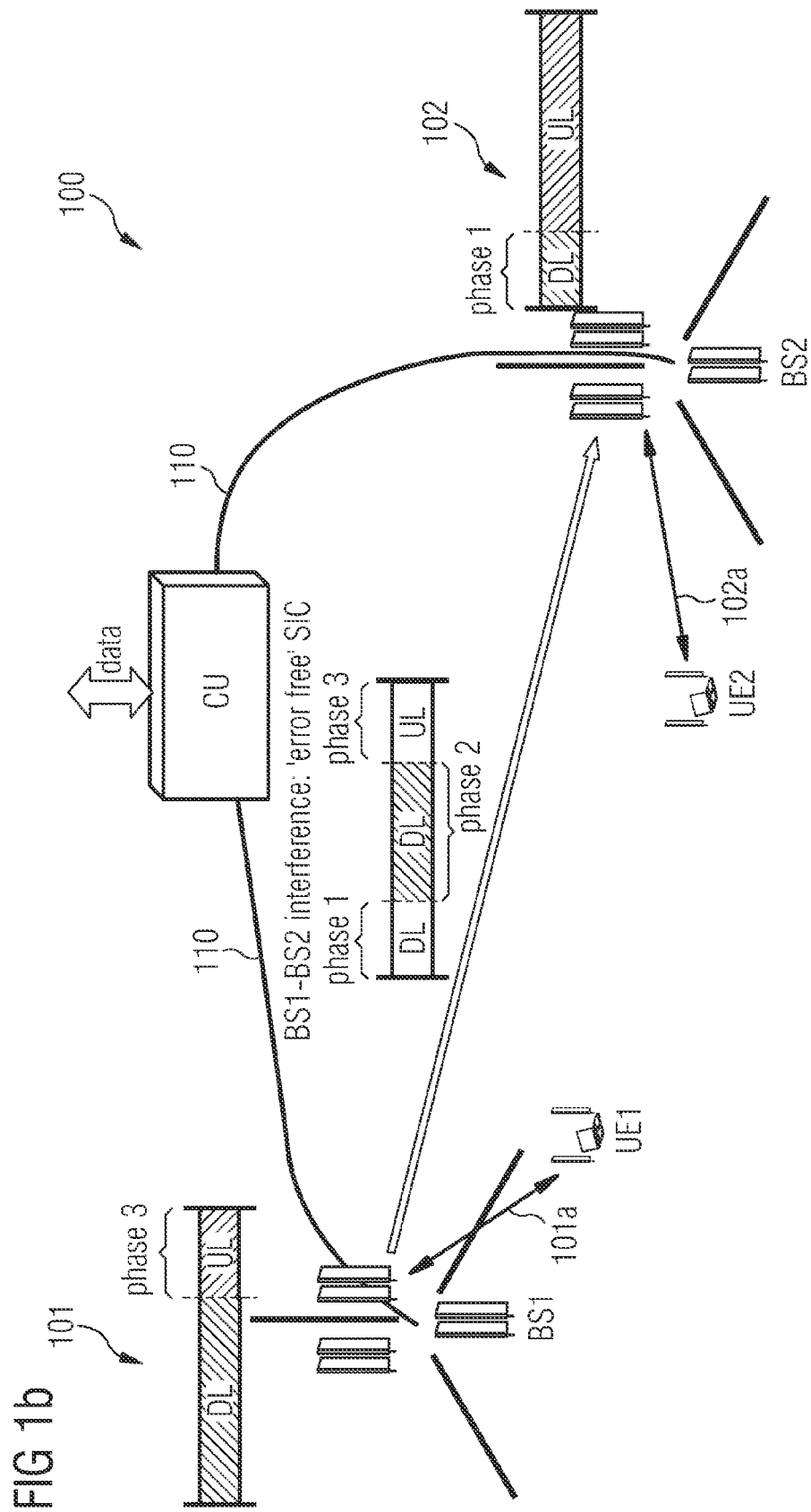

The illustration in the drawing is schematically. It is noted that in different figures, similar or identical elements are provided with the same reference signs.

FIGS. 1a to 1d show a cooperating area (CA) within a TDD telecommunication network 100. The CA 100 is the smallest possible CA comprising two cooperating cells. A first cell is served by a first base station BS1, the second cell is served by a second base station BS2.

According to the embodiment described here both base stations BS1 and BS2 have three sectors. Two antenna elements 105 are assigned to each sector. The spatial separation between the different sectors is indicated with lines 106.

The first base station BS1 serves a first user equipment UE1. The corresponding first serving connection is denominated with reference numeral 101a. The second base station BS2 serves a second user equipment UE2. The corresponding second serving connection is denominated with reference numeral 102a.

The two base stations BS1 and BS2 are connected to a central unit CU via a wired connection 110. According to the embodiment described here the connection 110 is established via a not depicted backbone network. In accordance with the principles of cooperative antenna (COOPA) systems, the CU controls the operation of the two base stations BS1 and BS2.

The two base stations BS1 and BS2 are operated with asymmetric switching points between downlink (DL) and uplink (UL) transmission. As can be seen from the time behavior 101, the first base station BS1 has a longer DL phase than UL phase. As can be seen from the time behavior 102, the second base station BS2 has a shorter DL phase than UL phase.

When comparing the transmission modes of the first base station BS1 and the second base station BS2 three different phases can be distinguished. In a first phase (see e.g. FIG. 1*a*, phase 1) both base stations BS1 and BS2 are in DL mode. In a second phase (see e.g. FIG. 1*b*, phase 2) the first base station BS1 is still in the DL mode whereas the second base station BS2 is already in the UL mode. In a third phase (see e.g. FIG. 1, phase 3) both base stations BS1 and BS2 are in UL mode.

By contrast to known COOPA TDD telecommunication systems with symmetric switching points for all base stations the described second phase makes the interference situation much more complex. It can be easily understood that the interference situation during phase 1 and during phase 3 can be handled in the same way as in known Frequency Division Duplex (FDD) COOPA telecommunication systems. However, the interference situation during phase 2 has to be handled differently to FDD cooperation.

In this respect it is mentioned that the interference condition during phase 2 (see FIGS. 1*b* and 1*c*) could also be caused by large propagation delays and by signals arriving at times after a main signal component has arrived. This holds in particular if moderate guard intervals or short cyclic prefixes in connection with large coverage areas are used.

As will be described in the following with reference to the FIGS. 1*a*-1*d* four different interference constellations (A), (B), (C) and (D) can be distinguished in the CA 100, which is operated in an asymmetric manner. Thereby, the interference constellations (A) is assigned to phase 1, the interference constellations (B) and (C) are assigned to phase and the interference constellations (D) is assigned to phase 3.

It is noted that the first user equipment UE1 is always in the same mode as its serving base station BS1. The same holds for the second user equipment UE2 and for the second base station BS2.

(A) As can be seen form FIG. 1*a*, in the first phase 1 both base stations BS1 and BS2 are in DL transmission mode to UE1 and UE2, respectively. This interference situation can be handled with conventional COOPA schemes like joint transmission can be used. Thereby, appropriate measures like zero forcing (ZF) and minimum means square error estimation can be applied.

(B) As can be seen from FIG. 1*b*, in the second phase the second base station BS2 switches from DL transmission to UL reception, while BS1 is still in DL transmission mode. This results into an interference between the first base station BS1 and the second base station BS2. Depending on antenna tilting the interference might be reduced to some extend, but at the same time there is a probability that there is a strong line of sight (LOS) connection between the two base stations BS1 and BS2 leading to large interference.

Usually base stations transmit their common reference signals simultaneously such that the BS-BS channels cannot be estimated directly. In other words, when transmitting their reference signals all BSs are in transmit mode. For that reason specific measurement phases will have to be defined for the channel estimation of the BS-BS connection.

One option is to let all BSs, which are still in DL phase, transmit reference signals as soon as the first BS changes to UL mode. As later other BSs might change to UL mode further reference signals might have to be transmitted from those BSs which are still in DL mode. So from an overhead perspective this is not the optimum solution, even so this would guarantee to get Channel State Information (CSI) with lowest latency.

More promising is probably to send reference signals for channel estimation at the end of the previous subframe, where all BSs will be in UL mode. For that purpose the BSs might just be assumed as additional UEs using orthogonal UE reference signals.

As the BS-BS channel is that between two fixed stations it can be additionally assumed that time variance of this channel will be very small. Therefore it may be enough to send reference signals every nth subframe. The number n should be decided by a main BS or the central unit CU controlling the CA based on the time variance of the BS-BS channels. For identification of the main BS and definition of the CA known techniques for establishing Self Optimizing Networks (SON) might be used.

Based on the BS-BS channel estimation a quasi "error free" Successive Interference Cancellation (SIC) can be performed at the interfered BS as soon as the interfering BS has send the transmitted data over the backbone network via the backbone network connection 110 to the interfered BS.

(C) As can be seen from FIG. 1*c*, in the second phase 2 there is additionally interference from the second user equipment UE2 to the first user equipment UE1. This interference may disturb the reception of the DL transmission from BS1 to UE1 via the serving connection 101*a*. Since the data signal being transmitted by the second user equipment UE2 is not known, a direct compensation of the interfering signal is not possible.

For that reason one could carry out a compensation in one of the next subframes by techniques similar to the well known Hybrid Automated Repeat Request (HARQ) schemes. The idea is to decode the UE2 UL signal at BS2 and in addition to calculate the resulting interference generated at UE1. For this purpose it is assumed that CSI between UE1 and UE2 has been estimated and send to the involved BSs.

In a later transmission phase the interference is taken into account by an according correction signal from BS1. Further, the first user equipment UE1 combines the received RX signals from the first distorted transmission with that of the correction signal of the second transmission.

It might be useful to send the correction signals in phase 3, while both BSs are in DL transmission so that no further UE-UE interference can distort the correction signal. Additionally this correction signal will have to be sent only in case that signal as well as interference are in the same order of magnitude. As well known, interfering signals, which are small can be seen as small additional noise and might be neglected, while large interferers can be easily cancelled at the interfered UE by SIC.

As UEs might move quite fast, the UE-UE channel estimation has to be done regularly and with low latency. For that purpose the DL signal from the serving BS should insert resource elements (RE), which carry no data nor reference signals at that symbol where UL transmission of the interfering UEs starts and at those REs where the corresponding UE will send own reference signals for CSI estimation. This will allow the interfered UEs to get an accurate channel estimation. The UEs may be informed by their serving BSs over according control channels where to measure the radio channels of the interfering UEs as well as from which subframe onwards they will have to expect additional UE interference.

Figure 1D:
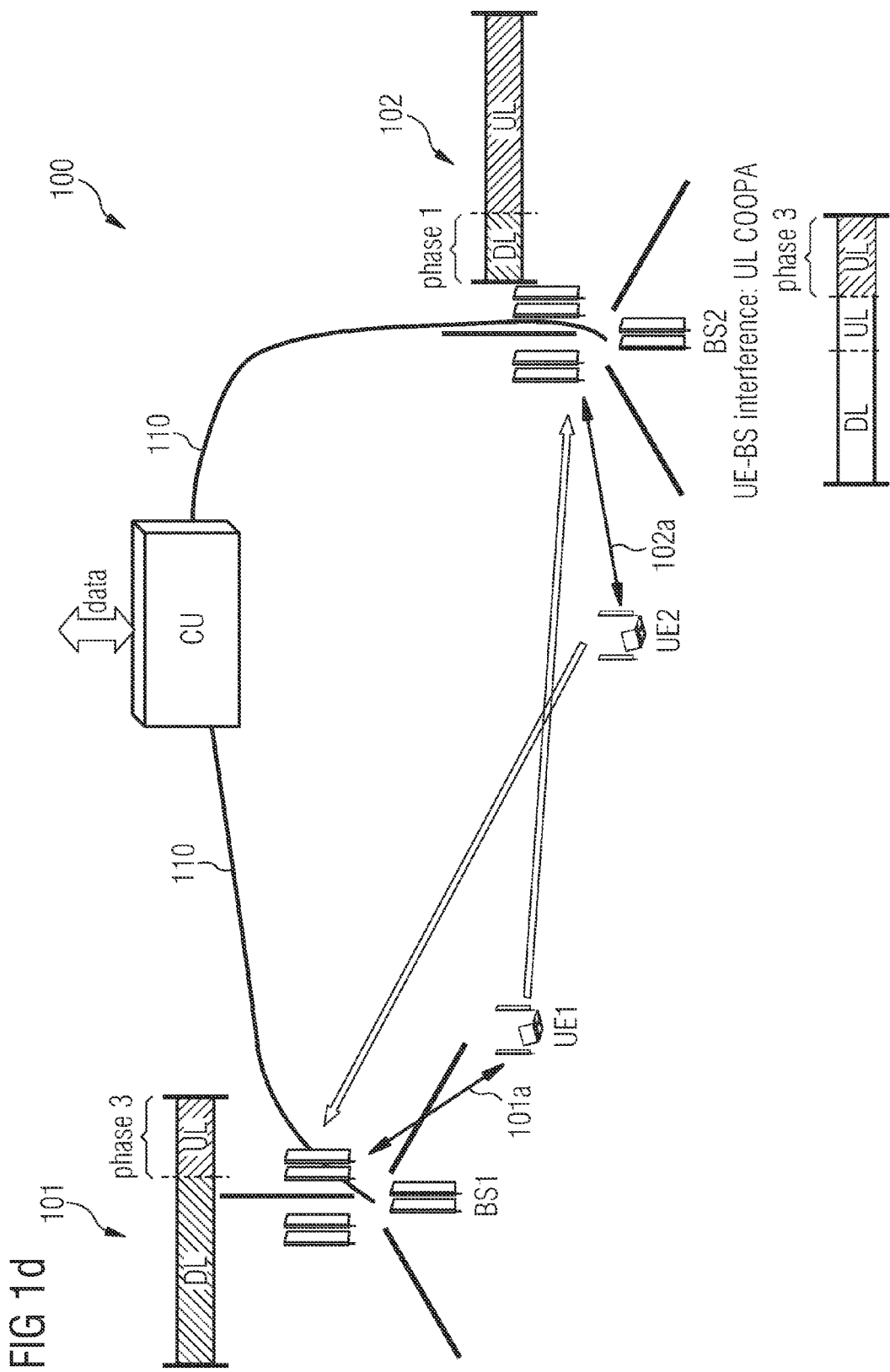
Figure 2:
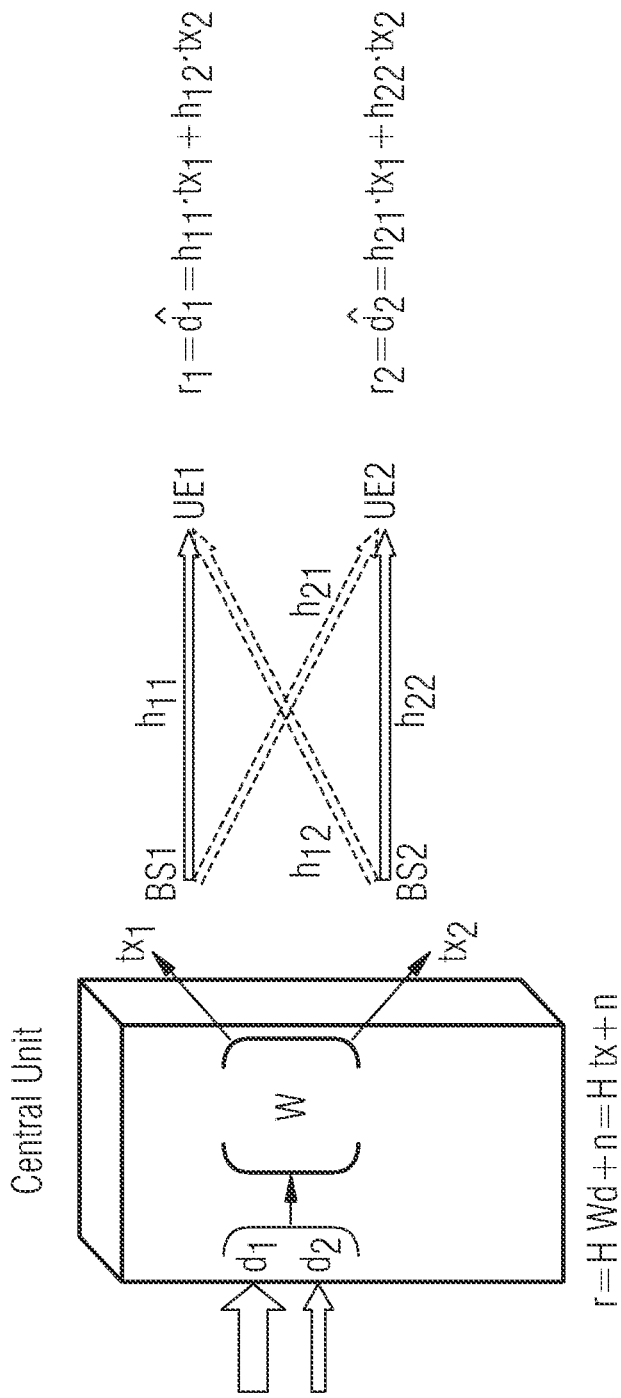
FIG. 2 shows a prior art solution for cooperative joint transmission within a cooperative telecommunication network.

(D) As can be seen from FIG. 1*d*, in the third and last phase 3 both base stations BS1 and BS2 are in the UL mode. Similarly to the situation depicted in FIG. 1*a*, this interference situation, which is symmetric to the interference situation depicted in FIG. 1*a*, can be handled with conventional COOPA schemes like joint transmission. Thereby, again appropriate measures like zero forcing (ZF) and minimum means square error estimation can be applied.

It should be noted that the term "comprising" does not exclude other elements or steps and "a" or "an" does not exclude a plurality. Also elements described in association with different embodiments may be combined. It should also be noted that reference signs in the claims should not be construed as limiting the scope of the claims.

LIST OF REFERENCE SIGNS 100 telecommunication network/cooperating area (CA)
101 time behavior of first base station
101a serving connection
102 time behavior of second base station
102a serving connection
105 antenna elements
106 sector separation
110 backbone network connection
BS1 first base station/first eNB
BS2 second base station/second eNB
CU central unit
UE1 first user equipment
UE2 second user equipment

The invention claimed is:

1. A method comprising:
compensating for interference effects within a telecommunication network comprising at least a first base station and a second base station, which serve in a cooperative manner a first user equipment and a second user equipment by using time division duplex, wherein the telecommunication network is in an operational state, in which the first base station is in a downlink mode and the second base station is in an uplink mode, by:
determining at least one of a first channel state information between the first base station and the second base station and a second channel state information between the first user equipment and the second user equipment;
encoding data signals based on the first channel state information and/or on the second channel state information;
transmitting the encoded data signals by the first base station and/or by the second base station; and
transmitting the second channel state information to the first base station and/or to the second base station, wherein the second channel state information is only transmitted to the first base station and/or to the second base station if a data retransmission is required;
wherein the data retransmission is carried out with a first retransmission data unit, which is transmitted during a first phase of the telecommunication network, during which both the first base station and the second base station are in a downlink mode, and/or with a second retransmission data unit, which is transmitted during a second phase of the telecommunication network, during which the first base station is still in the downlink mode and the second base station is already in an uplink mode.

2. The method as set forth in claim 1, wherein for encoding the data signals a channel reciprocity is taken into account.

3. The method as set forth in claim 1, further comprising broadcasting a first reference signal by the first base station and
receiving the first reference signal by the second base station, wherein for determining the first channel state information the received first reference signal is taken into account.

4. The method as set forth in claim 3, wherein
the first reference signal is broadcasted every nth subframe, wherein n is an integer number.

5. The method as set forth in claim 3, wherein the first reference signal is broadcasted on at least one specific frequency sub-band.

6. The method as set forth in claim 1, wherein for determining the second channel state information second reference signals are transmitted on specific downlink subframes.

7. The method as set forth in claim 1, further comprising
transmitting data from the first base station to the second base station over
the radio link extending between the two base stations and a backbone network which wire-connects the two base stations with each other.

8. The method as set forth in claim 1, further comprising
transmitting a control signal from the first base station to the first user equipment and/or from the second base station to the second user equipment, wherein the control signal is indicative for a particular subframe, during which the second channel state information is determined.

9. A program element that compensates for interference effects within a telecommunication network, the program element being stored on a non-transitory computer readable medium, the program element controlling at least a first base station and a second base station, which serve in a cooperative manner a first user equipment and a second user equipment by using time division duplex; the program element, when being executed by a data processor, being adapted for controlling the method as set forth in claim 1.

10. A non-transitory computer-readable medium on which there is stored a computer program that compensates for interference effects within a telecommunication network comprising at least a first base station and a second base station, which serve in a cooperative manner a first user equipment and a second user equipment by using time division duplex; the computer program, when being executed by a data processor, being adapted for controlling the method as set forth in claim 1.

11. A telecommunication network that compensates for interference effects, in particular a time division duplex cooperating telecommunication network, the telecommunication network comprising:
at least one processor and at least one memory including a computer program code, wherein the at least one memory and the computer program code are configured, with the at least one processor, to cause the telecommunication network to perform:
determining at least one of a first channel state information between a first base station and a second base station, and a second channel state information between a first user equipment and a second user equipment, wherein the first base station and the second base station are adapted to serve the first user equipment and the second user equipment in a cooperative manner, and which are settable in an operational state, in which the first base station is in a downlink mode and the second base station is in an uplink mode,
encoding data signals based on the first channel state information and/or on the second channel state information;
transmitting the encoded data signals by the first base station and/or by the second base station; and
transmitting the second channel state information to the first base station and/or to the second base station, wherein the second channel state information is only transmitted to the first base station and/or to the second base station if a data retransmission is required;

wherein the data retransmission is carried out with a first retransmission data unit, which is transmitted during a first phase of the telecommunication network, during which both the first base station and the second base station are in a downlink mode, and/or with a second retransmission data unit, which is transmitted during a second phase of the telecommunication network, during which the first base station is still in the downlink mode and the second base station is already in an uplink mode.

* * * * *